United States Patent [19]

Baker et al.

[11] Patent Number: 5,129,921
[45] Date of Patent: Jul. 14, 1992

[54] MEMBRANE GAS SEPARATION PROCESS AND APPARATUS

[75] Inventors: Richard W. Baker, Palo Alto; Johannes G. Wijmans, Menlo Park, both of Calif.

[73] Assignee: Membrane Technology & Research, Inc., Menlo Park, Calif.

[21] Appl. No.: 707,754

[22] Filed: May 30, 1991

[51] Int. Cl.⁵ .............................................. B01D 53/22
[52] U.S. Cl. ............................................ 55/16; 55/68; 55/158
[58] Field of Search ............................. 55/16, 68, 158

[56] References Cited

U.S. PATENT DOCUMENTS

| | | | |
|---|---|---|---|
| 3,455,817 | 7/1969 | Modell | 55/16 X |
| 4,230,463 | 10/1980 | Henis et al. | 55/16 |
| 4,243,701 | 1/1981 | Riley et al. | 427/244 |
| 4,553,983 | 11/1985 | Baker | 55/16 |
| 4,654,047 | 3/1987 | Hopkins et al. | 55/16 X |
| 4,675,030 | 6/1987 | Czarnecki et al. | 55/16 |
| 4,701,187 | 10/1987 | Choe et al. | 55/16 |
| 4,717,407 | 1/1988 | Choe et al. | 55/158 X |
| 4,840,646 | 6/1989 | Anand et al. | 55/16 |
| 4,963,165 | 10/1990 | Blume et al. | 55/16 |
| 5,032,148 | 7/1991 | Baker et al. | 55/16 |

FOREIGN PATENT DOCUMENTS

| | | | |
|---|---|---|---|
| 63-218232 | 9/1988 | Japan | 55/158 |
| 1-037405 | 2/1989 | Japan | 55/158 |
| 1-252502 | 10/1989 | Japan | 55/16 |

OTHER PUBLICATIONS

Y. Shindo et al., "Calculation Methods for Multicomponent Gas Separation by Permeation", Sep. Sci. and Tech., 20, pp. 445-459, 1985.

S. S. Kremen, "Technology and Engineering of ROGA reverse Osmosis Membrane Modules", Reverse Osmosis and Synthetic Membranes, NRC Canada (1977).

*Primary Examiner*—Robert Spitzer
*Attorney, Agent, or Firm*—J. Farrant

[57] ABSTRACT

A system and process useful for a gas separation operation. The system includes three components: a membrane unit, a pump, blower, ejector or the like to provide gas flow to the membrane unit and a gas holding vessel. The system and process can be used to treat any type of gas flow, but have particular advantages for handling streams where the gas flow varies substantially over time.

11 Claims, 7 Drawing Sheets

MEMBRANE GAS SEPARATION PROCESS AND APPARATUS

FIELD OF THE INVENTION

The invention relates to membrane-based gas separation.

BACKGROUND OF THE INVENTION

Separation of gas mixtures by means of membranes is well known. Industrial uses of membrane-based gas separation systems include the production of oxygen-enriched air, nitrogen production for blanketing, separation of carbon dioxide from methane, hydrogen recovery from various gas mixtures and removal of organic vapors from various gas mixtures. Design of a membrane system for any particular application can be a complex matter, where narrow specifications for the composition of gas streams entering and leaving the membrane system must be met and where operating parameters must be constrained within certain values.

In any design, an important consideration is the membrane feed gas flow rate. Upon this flow rate depend the membrane area required and the flow capacities of ancillary equipment, such as pumps, condensers, etc. Furthermore, fuctuations in feed flow can have a serious effect on the performance of the membrane system. If the feed flow fallsy substantially below the lower limit for which the membrane system was designed, there may be poor mixing in the feed gas, resulting in a boundary layer adjacent the membrane surface that is depleted in the faster permeating gas. In consequences, the degree of enrichment of that gas in the permeate decreases. If the feed flow rises substantially above the upper limit for which the membrane systemw as designed, the result is a diminished stage cut and poorer removal from the feed. Thus, membrane systems are relatively sensitive to fluctuations in feed gas flow and do not handle well streams characterized by surges of high gas flow or periods of very low gas flow.

Gas streams with nonconstant flow rates are produced by many processes. If a membrane system is to treat such a gas stream, one way to accomodate the fluctuations is to size the membrane system to treat the maximum possible flow. This often means that the membrane system is grossly oversized. Besides the inefficiencies and extra costs associated with underuse of equipment, this may result in the boundary layer problems described above. There are many situations where a membrane system could provide a technically and economically attractive solution to a gas separation problem, were it not for too widely fuctuating feed gas flow.

SUMMARY OF THE INVENTION

The invention is concerned with gas separation by means of membranes. In one aspect, the invention is a system used to carry out a gas separation operation. The system includes three components: a membrane unit, a means of producing gas flow to the membrane unit and a gas holding vessel. The system can be used for any type of gas flow, but has particular advantages for handling streams where the gas flow varies substantially over time. The system is especially valuable for handling gas flows characterisited by intermittent surges of short duration during which the gas flow is very high compared with the nonsurge flow.

1. Membrane Unit

The membrane unit contains a membrane that is preferentially permeable to one component of a gas stream. Depending on the separation that is to be performed, many different types of membrane could be used. The driving force for permeation of a component across the membrane is the partial pressure difference of that component between the feed and permeate sides, which can be generated in a variety of ways. When the membrane unit is in use, it produces a permeate stream enriched in the preferentially permeating component compared with the feed and a residue stream depleted in the preferentially permeating component. The membrane unit may be configured in many possible ways, and may include a single membrane stage, containing one or more membrane modules, or an array of two or more sets of modules in various series or parallel arrangements.

2. Means for Providing Gas Flow

A pump, blower or the like is connected in the feed line to the membrane unit. This provides a flow of gas to the membrane unit for treatment. The pump or blower is chosen to have a certain maximum capacity, taking into account the average flow of raw gas to be treated and the likely magnitude and duration of variations therefrom. However, it is not necessary that the capacity of the pump or blower be large enough to accomodate the maximum flow anticipated. The invention provides a gas treatment system that can produce an adequately treated residue gas stream under widely fluctuating conditions of raw gas flow that both substantially exceed and substantially fall below the rated capacity of the feed pump or blower.

3. Gas Holding Vessel

This vessel has two ports, one connected to the residue line from the membrane unit, the other connected to the feed line to the membrane unit.

The feed line conncection is upstream of the pump or other flow means. Gas can flow into and out of the holding vessel, either in the residue-to-feed direction or the feed-to-residue direction. The presence of this holding vessel and the ability for gas to flow in and out in either direction re important features of the invention. These features give the system of the invention particular advantages in handling raw gas charcterized by a fluctuating flow rate. If the raw gas is flowing for a time at a rate greater than the capacity of the flow means, some gas will bypass the flow means and enter the holding vessel. When the flow rate drops to a level below the capacity of the flow means, gas will be withdrawn from the holding vessel and passed through the flow means to the membrane unit for treatment. Using the teachings of the invention, the holding vessel can be sized in relation to the flow means capacity, and both can be sized in relation to the expected raw gas flow pattern, to yield a treated gas stream of a particular composition or range of compositions. In this way, considerable fluctuations in raw gas flow can be accomodated, without having to discharge raw, untreated gas and while maintaining the treatment level to a given standard.

Even if the flow of raw gas ceases altogether for a time, it is possible to run the membrane unit byh passing gas from the residue line to the holding vessel to the feed line. This will affect the composition of the permeate gas, but may be preferable to having to start up and shut down the system frequently.

In another aspect, the invention is a gas separation process. The process involves the use of the gas separation system described above. Raw gas is fed to the system upstream of the flow means. Treated gas is discharged from the system as a residue stream from the membrane unit. A permeate gas stream, concentrated in the component that was to be removed from the raw gas, is withdrawn from the permeate side of the membrane.

It is an object of the invention to provide a membrane-based gas separation system suitable for handling a gas stream of nonconstant flow.

It is an object of the invention to provide a membrane-based gas separation process suitable for handling a gas stream of nonconstant flow.

It is an object of the invention to reduce atmospheric emissions of untreated gas.

It is an object of the invention to provide systems and processes for treating gas emissions from vents.

Other objects and advantages of the invention will be apparent from the description of the invention to those of oridnary skill in the art. It is to be understood that the above summary and the following detailed description are intended to explain and illustrate the invention without restricting its scope.

DETAILED DESCRIPTION OF THE INVENTION

The invention has two aspects, a gas treatment system and a gas treatment process. The treatment system is a membrane-based gas separation system. The gas stream to be treated may be an effluent stream that would otherwise be discharged untreated, or would be subject to some other treatment method or methods. Alternatively it may be an internal process stream from which it is desirable to remove one or more components. The system can be used to treat any gas stream, but is adapted for handling raw gas flowing to the system at a nonconstant rate.

Figure 1:
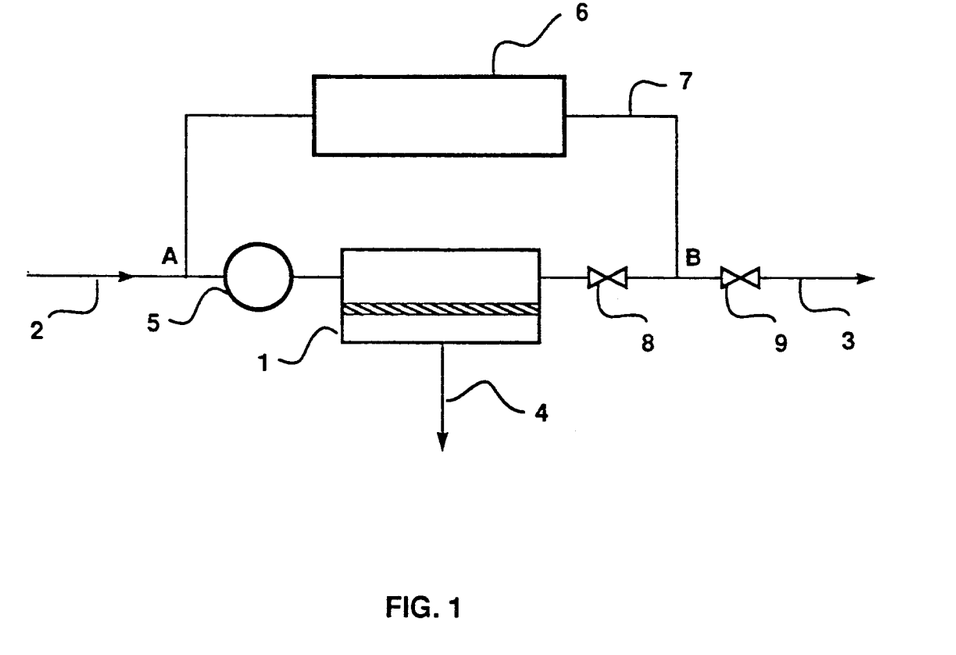
FIG. 1 is a schematic drawing showing a basic embodiment of a gas separation system.

A basic embodiment of the invention is shown in FIG. 1. Referring now to this figure, the gas treatment system comprises a membrane unit 1, a flow means 5 and a vessel 6. The membrane unit has a feed line 2, through which gas can enter for treatment and permeate line 4 and residue line 3, from which lines gas can be withdrawn after treatment. Flow means 5 is connected in feed line 2. A connecting line 7 joins the feed and residue lines. Gas holding vessel 6 is connected in connecting line 7. Valves 8 and 9 are pressure-regulating valve. Valve 8 is set to open at a higher pressure than valve 9. Valve 8 controls the pressure on the feed side of the membrane generated by flow means 5. Valve 9 controls the pressure between valves 8 and 9 and is set to determine the relative portions of the residue stream from the membrane unit that are discharged and passed to holding vessel 6.

The membrane unit contains a membrane used to separate one or more gases from a gas mixture. The membrane used to perform the separation may be a homogeneous membrane, a membrane incorporating a gel or liquid layer, or any other type known in the art. Two types of membrane are preferred. The first is a composite membrane, comprising a microporous support, onto which the permselective layer is depsoited as an ultrathin coating. The second is an asymmetric membrane in which the thin, dense skin of the asymmetric membrane is the permselective layer. Both composite and asymetric membranes are known in the gas separation art. References that teach the production of such membranes include U.S. Pat. Nos. 4,243,707; 4,553,983; 4,230,463; and 4,840,646.

The form in which the membranes are used in the inveniton is not critical. They may be used, for example, as flat sheets or discs, hollow fibers, or spiral-wound modules, all forms that are known in the art. Spiral-wound modules are a convenient choice. References that teach the preparation of spiral-wound modules are S. S. Kremen, "Technology and Engineering of ROGA Spiral Wound Reverse Osmosis Membrane Modules", in *Reverse Osmosis and Synthetic Membranes*, S. Sourirajan (Ed.), National Research Council of Canada, Ottawa, 1977; and U.S. Pat. No. 4,553,983, column 10, lines 40-60. Alternatively the membranes may be configured as asymmetric or composite hollow fibers and potted into a module.

The driving force for permeation is the difference between the partial pressures of the gas components on the feed and permeate sides. The pressure drop across the membrane can be achieved by pressurizing the feed, by evacuating the permeate or by both. For example, a vacuum pump may be used on the permeate side to provide the necessary transmembrane driving force.

The membrane unit may be configured in many possible ways. The simplest unit is a signle-stage unit as shown schematically in FIG. 1. Such a unit contains a single membrane module or a singl bank of membrane modules. As will be appreciated by those of skill in the art, the membrane unit can be configured in many possible ways, and may include a signal membrane stage or an array of two or more blanks of modules connected in series or parallel. In this case, either the permeate or the residue stream, or both, from the first bank of modules is subjected to a second or multiple membrane separation steps.

The function of the flow means is to provide a flow of incoming gas to the membrane unit for treatment. Numeral 5 refers generally to any flow means, including any kind of pump or compressor, such as a rotary vane pump, a liquid ring pump, a diaphragm pump, a piston pump, a jet ejector, a blower, etc.

Figure 2:
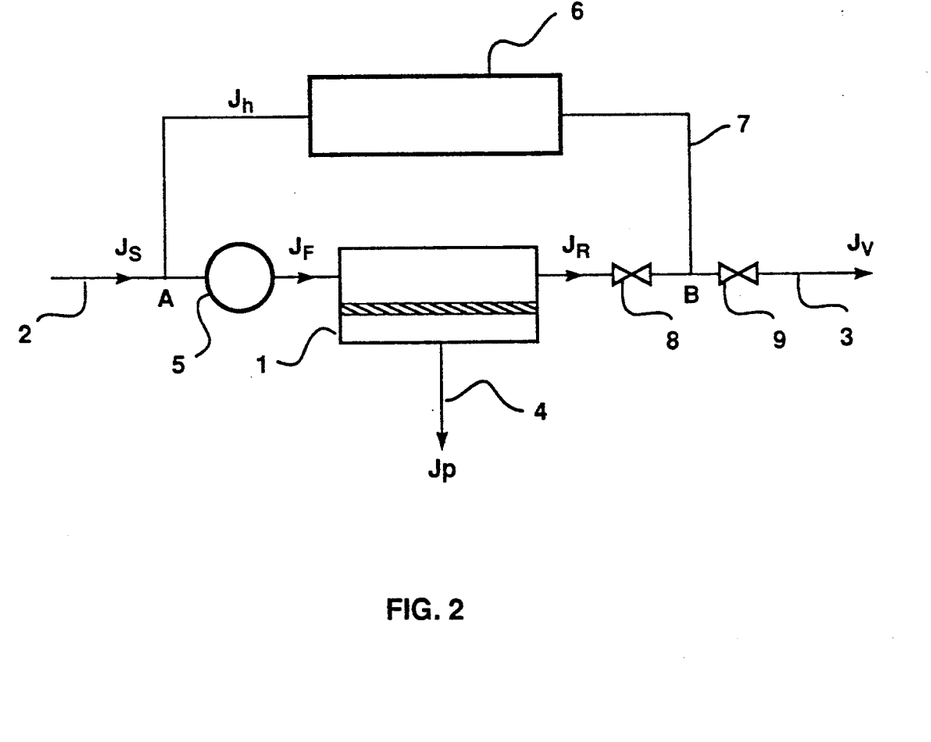
FIG. 2 is a schematic drawing showing a gas separation process.

The system operates as shown in FIG. 2. Referring now to this figure like elements of the system are identified by the same numeral as in FIG. 1. Gas flows are indicated as follows:

$J_s$ raw gas from the source to be treated
$J_f$ feed gas to the membrane unit
$J_r$ treated residue stream from the membrane unit
$J_p$ permeate stream from the membrane unit $J_v$ discharge stream
$J_h$ gas stream flowing in connecting line through holding vessel By mass balance, the following relationships between the streams apply:

$$J_s = J_f J_h$$

$$J_f = J_r + J_p$$

$$J_r = J_h + J_v$$

$$J_s = J_p + J_v$$

The operatoin of the system varies depending on the relative magnitudes of the raw gas flow $J_8$, the flow means capacity $J_f$ and the holding vessel volume, V. The operation of the system also varies depending whether the raw gas flow rate is substantially constant or variable. Representative operating modes are as follows:

1. Raw gas flow $J_s$ substantially constant. $J_s = J_p$

In this situation, the raw gas flow rate is very low, less that the capacity of the flow means and less than the flow $J_p$ through the membrane unit if the system were operating at normal capacity. Flow means 5 normally acts as a compressor to maintain a fixed pressure of gas in the membrane unit at a pressure determined by the pressure regulating valve 8 and at a flow rate $J_f$. However, if the incoming flow of raw gas is very low, the flow means will be unable to maintain the set pressure within the membrane unit. No gas will pass through pressure regulating valve 8, valve 9 will close and the pressure on the upstream side of the flow means will fall. The net result will be that the membrane unit will operate in "dead end" mode and all of the gas entering as flow $J_8$ will leave as membrane permeate stream $J_p$.

2. Raw gas flow $J_s$ substantially constant. $J_s < J_f$ and $J_s < J_p$

In this situation, the raw gas flow is below the capacity $J_f$ of the flow means, but is greater than the normal flow through the membrane $J_p$. There is a flow of gas $J_h$ from holding vessel through connecting line 7 to feed line 2 in the direction B→A. Raw incoming gas flow $J_s$ is mixed with previously treated flow $J_h$ to provide flow $J_f$ through the membrane system. The membrane system divides the gas into a permeate flow $J_p$ and a treated flow $J_r$. The treated gas is divided at point B into two portions $J_h$, which is circulated to the gas holding vessel, and $J_v$, which is discharged at a rate controlled by the action of regulating valve 9.

3. $J_s$ substantially constant. $J_s > J_f$

In this situation, the raw gas flow exceeds the capacity of flow means 5, so the incoming gas divides at point A, the excess gas flowing as stream $J_h$ through connecting line 7 to gas holding vessel 6 in the direction A→B. The treated gas and the excess gas mix at point B and leave the treatment system together as stream $J_v$.

When the raw gas flow is substantially constant, the performance of the system is similar to the performance that would be obtained from a membrane separation system without the holding vessel. When the raw gas flow is nonconstant, however, the system of the invention performs much better than previously available systems.

4. Raw gas flow $J_s$ nonconstant.

Figure 3:
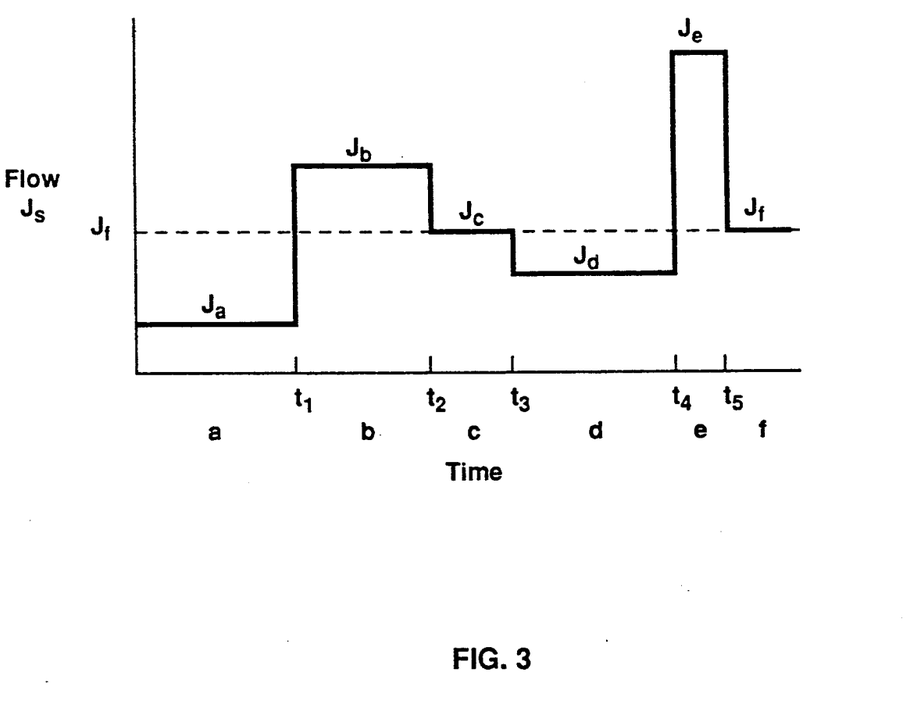
FIG. 3 is a flow profile of a nonconstant gas flow.

An example of a flow profile for a nonconstant raw gas flow is given in FIG. 3. Referring now to this figure, over a time interval a, incoming raw gas is flowing ar rate $J_a$, below the capacity $J_f$ of the flow means. A flow $(J_f - J_a)$ of treated gas is, therefore, recirculated by the compressor through connecting line 7 in the direction B→A. The holding vessel and connecting line are completely filled with treated gas at time $t_1$. The raw gas flow then increases to $J_b$ for time interval b. Flow $J_b$ is greater than the compressor capacity $J_f$, so a portion $(J_b - J_f)$ flows into connecting line 7 in the direction A→B, displacing treated gas from the holding vessel and the line at the rate $(J_b J_f)$. At time $t_2$, the raw gas flow drops to a value $J_c$ equal to $J_f$ for a time interval c. During interval c the only gas flowing through the membrane unit is raw incoming gas and there is no gas flow in connecting line 7 in either direction. At time $t_3$, the raw gas flow drops to $J_d$, less than $J_f$, for time interval d. Gas is withdrawn from the holding vessel and connecting line to make up flow $J_f$ through the compressor. Thus the raw gas that was accumulated in the connecting line and holding vessel during interval b is now drawn through the membrane unit and recirculated, treated, to the holding vessel. At time $t_4$, the raw gas flow rises to a very high value $J_e$ for a short time interval e. Excess raw gas flows into the holding vessel, displacing gas that was treated during interval d. Finally, the raw gas flow returns to the flow means capacity value $J_f$.

The ideal system performance is achieved when no untreated gas is discharged and when the compositions of residue and permeate streams meet any specified target values throughout a cycle such as that described above. The performance of the gas treatment system depends on the capacity of the flow means and the volume of the gas holding vessel. To achieve an ideal performance, the capacity of the flow means should be at least equal to the average raw gas flow that is expected over an operating cycle of the system. Also, the volume of the gas holding vessel should be large enough to absorb all the excess gas passed to it during the largest surge that is expected over an operating cycle of the system. For example, if the raw gas flow exceeds the compressor capacity by 10L/min for 15 minutes, the capacity of the holding vessel should be at least 150L. As the excess raw gas flows into the vessel, it will displace 150L of treated gas, which can be discharged.

The system of the invention offers substantial advantages over prior gas treatment systems even when these ideal values are not used. The size of the holding vessel can be chosen by calculating the excess volume of gas that will flow to the vessel during a typical surge according to the expression:

$$V = k \left[ \int_{t_1}^{t_2} J_s dt - J_f(t_2 - t_1) \right] \quad (1)$$

where V is the holding vessel volume, $J_s$ is the raw gas flow during a surge, times $t_1$ and $t_2$ define the duration of the surge $J_f$ is the flow means capacity and k is a constant.

Preferably the volume of the gas holding vessel should be at least 25% of the excess volume of raw gas flowing during the largest expected surge, more preferably the volume should be at least 50% of this value and most preferably the volume should be at least 100%. If the volume of the vessel is greater than the volume of excess gas during an expected surge, this provides a safety factor that would enable the system to handle an unexpectedly high "spike" of gas, for example. Thus the constant k may have any value, but preferably has a value at least 0.25, more preferably at least 0.5 and most preferably at least 1. Where a safety factor is to be incorporated, the value of k could be 1.5, 2 or any other number greater than 1.

The holding vessel preferably should be shaped such that turbulence within the vessel is not encouraged. For example, untreated gas entering the vessel should displace treated gas from the vessel without mixing with it as far as possible. Likewise treated gas entering the vessel should displace untreated gas with little mixing. A vessel with its longest dimension parallel to connecting line 7 is preferred in this regard. The vessel may also include one or more baffles to restrict gas mixing.

Examples of gas streams of fluctuating flow rate that could be treated by the system include, but are not limited to:

1. Vent gas from an industrial refrigerator. Industrial refrigerators are purged from time to time, or continuously, to remove air that may have leaked into the refrigeration loop on the low-pressure side. The purge gas stream contains air in refrigerant. Conventionally, as much refrigerant as possible is captured by condensation, and the remainder of the stream is vented. In many cases, it would be advantageous to treat the purge stream further before venting. For example, CFC-12 is one of the most commonly used refrigerants. Typical vent streams flow rates are 1-5 scfm, sometimes with occassional much higher flow "spikes". A single 1-scfm stream containing 10% CFC-12 can cause an atmospheric discharge of 16,000 lb/year.

2. Vent gas from industrial air conditioners. A single industrial air-conditioning unit can vent 100-300 lb/year of CFC-11 or other refrigerant to the atmosphere. It is estimated that there are 80,000 such units installed in the United States.

3. Exhaust gas from chemical processing and other industries. Exhaust gases containing organic or inorganic contaminants occur throughout industry. For example, in chemical processing, gas emissions may be generated intermittently as air or inert gases containing organic solvents are removed from distillation operations, evaporators or reactors. In the refining of metals, and in the preparation of chemical feedstocks and commodities, off-gas streams containing combustion gases or other pollutants must be handled. One representative case is the removal of sulfur dioxide from streams produced in Claus plants or smelters. Suitable membranes for sulfur dioxide removal include composite membranes with selective layer made from polymers having the general formula:

where PA is a polyamide segment and PE is a polyether segment. The preparation and use of such membranes is described in U.S. Pat. No. 4,963,165, incorporated herein by reference. Typically such a membrane might exhibit a sulfur dioxide normalized flux of $6 \times 10^{-3}$ $cm^3(STP)/cm^2 \cdot s \cdot cmHg$ and a sulfur dioxide/nitrogen selectivity of 250. A system as shown in FIG. 1 and containing a polyamide-polyether block copolymer membrane could be sized, for example, to handle an average flow of off-gas from a smelter of 10 scfm. Thus the compressor capacity could be chosen to be 10 scfm. Surges of up to 25 scfm might occur for periods of 2-5 minutes as various process valves open. According to Equation 1, a holding vessel volume of $(25 \times 5) - (10 \times 5)$, or 75 scf, would be able to handle the maximum expected surge with no raw gas discharge.

4. Storage or transfer operation losses. A common application of the invention is the handling of vapor-laden vent gases from loading and unloading of chemical storage tanks, breathing losses and transfer operations. The composition of a typical vent gas stream from a gasoline storage tank is:

| Component | Concentration (%) |
| --- | --- |
| Nitrogen | 47.50 |
| Oxygen | 12.63 |
| Methane | 0.04 |
| Ethane | 0.04 |
| Propane | 1.03 |
| Propene | 0.14 |
| Butane | 12.96 |
| Butene | 3.58 |
| Pentane | 11.84 |
| Pentene | 1.59 |
| Hexene | 0.41 |
| Benzene | 0.51 |
| Heptane | 0.53 |
| Toluene | 0.47 |
| Octanes | 0.07 |
| Nonanes | 0.02 |
| Oxygenates (methanol, ethanol, TBA, MTBE or TAME). | 3.24 |

Membranes with rubbery separation layers can be used to separate the hydrocarbon components from air. Two sets of representative permeation properties achievable with rubbery membranes are listed below.

| Gas | Normalized Flux $(cm^3(STP)/cm^2 \cdot s \cdot cmHg)$ | |
| --- | --- | --- |
|  | Membrane 1 | Membrane 2 |
| Nitrogen | $1.0 \times 10^{-4}$ | $2.0 \times 10^{-5}$ |
| Oxygen | $2.2 \times 10^{-4}$ | $5.2 \times 10^{-5}$ |
| Propane | $1.0 \times 10^{-3}$ | $4.0 \times 10^{-4}$ |
| n-Butane | $1.5 \times 10^{-3}$ | $7.0 \times 10^{-4}$ |
| n-Pentane | $2.0 \times 10^{-3}$ | $1.2 \times 10^{-3}$ |
| n-Hexane* | $3.0 \times 10^{-3}$ | $1.4 \times 10^{-3}$ |
| Heptane* | $4.0 \times 10^{-3}$ | $1.6 \times 10^{-3}$ |

*Estimated values

In a storage facility, the average flow from a tank vent over a twenty-four period might be, for example, 4 scfm. However, the flow might be as high as 20 scfm, for example, for 5-10 minute periods during transfer operations. There migth also be periods as long as 30 minutes when the flow might remain at 6 scfm, for example. to handle this situation with minimal hydrocarbon loss, a system as shown in FIG. 1 and sized in accordance with the teachings above could be used. The hydrocarbon could be captured in the membrane permeate stream and returned to the storage tank. The flow means capacity should be at least 4 scfm. Using a compressor rated at 8 scfm would provide a safety factor for unexpected surges. With k chosen as 1 in Equation 1, the size of the holding vessel should be $(20\times10)-(8\times10)$, or 120 scf. A larger holding vessel would provide an additional safety factor.

In a second aspect, the invention is a gas separation process. The process involves the use of the gas separation system described above. Raw gas is fed to the system upstream of the flow means. Treated gas is discharged from the system as a residue stream from the membrane unit. A permeate gas stream, concentrated in the component that was to be removed from the raw gas, is withdrawn from the permeate side of the membrane. By sizing the several system components in accordance with the teachings herein, it is possible to achieve substantial removal, such as 70%, 80% or 90%, of a chosen component from the raw gas stream under conditions where the raw gas flow fluctuates substantially. It is simultaneously possible to reduce or eliminate discharges of untreated gas.

Figure 6:
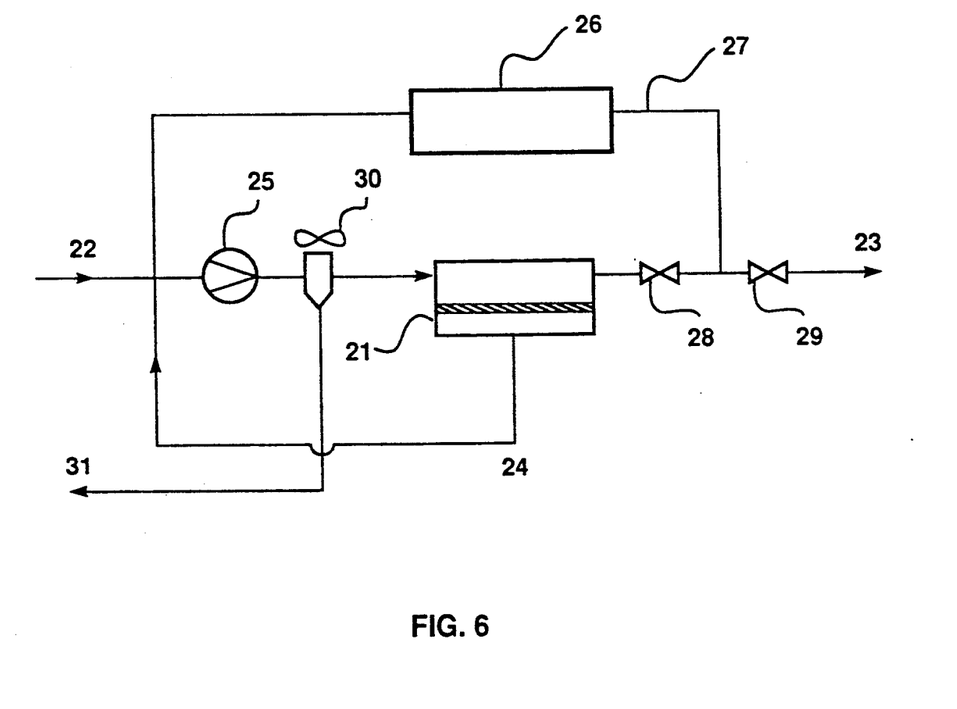
FIG. 6 is a schematic drawing showing a gas separation system with a condenser in the membrane feed line.

FIGS. 1 and 2 are a schematic of the invention in general form. It will be appreciated by those of skill in the art that other components could be included in the system at various points within the scope of the invention. As a nonlimiting example, FIG. 6 shows a system that could be used to handle a purge stream from an industrial refrigerator. In this case, the raw purge gas is heavily laden with refrigerant. An air-cooled condenser 30 is positioned in feed line 22 between compressor 25 and membrane unit 21. The condenser liquifies a portion of the refrigerant, which is withdrawn through line 31 for return to the refrigeration cycles. The remainder of the raw gas passes to membrane unit 21. Treated gas is withdrawn through residue line 23. Gas holding vessel 26 is connected between the feed and residue lines by connecting line 27. Valves 28 and 29 are pressure-regulating valves. Permeate line 24 is connected to feed line 22. In this way, refrigerant-enriched permeate gas from the membrane unit is returned upstream of compressor 25 for refrigerant removal in condenser 30.

Figure 7:
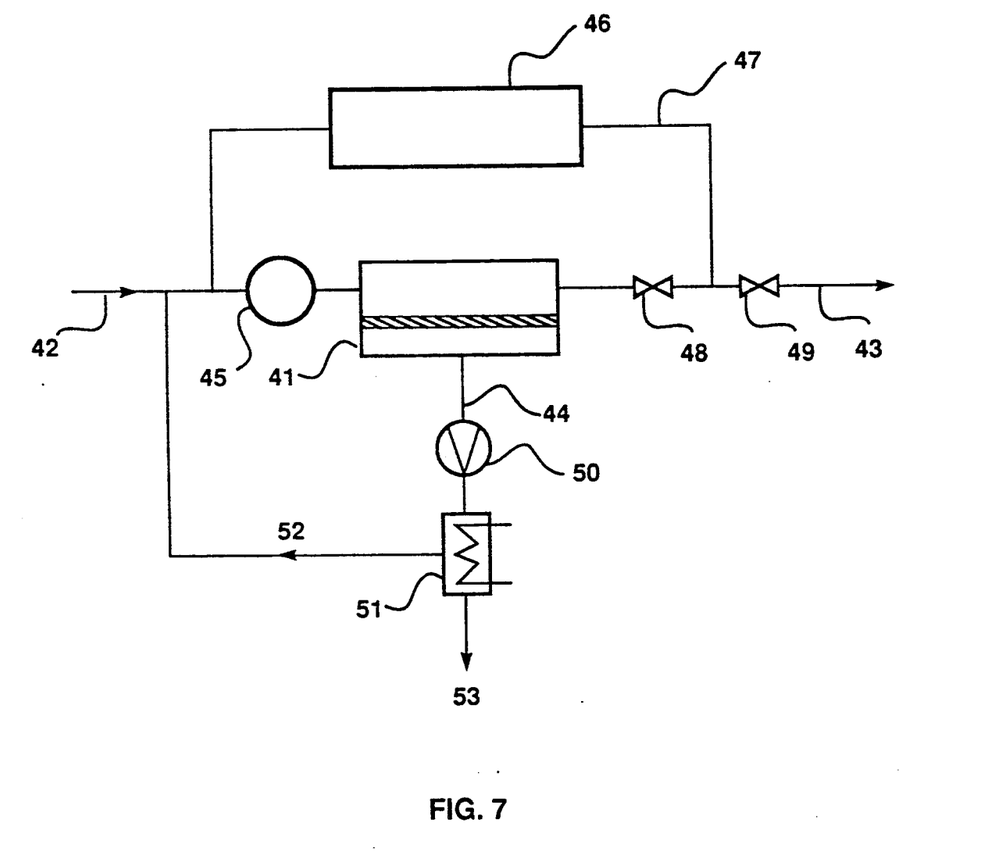
FIG. 7 is a schematic drawing showing a gas separation system with a vacuum pump and condenser in the membrane permeate line.

As a second nonlimiting example, FIG. 7 shows a system that could be used to recover organic vapors vented from a storage tank, such as a solvent holding tank or a gasoline tank. In this design, a low pressure blower 45 is used in feed line 42 to generate the pressure required to create gas flow through the membrane unit 41 and the valve 48. A driving force for membrane permeation is provided by vacuum pump 50 connected in permeate line 44. Condenser 51 produces a stream of liquid organic component, which is withdrawn through line 53. Any noncondensed vapor or gases are returned upstream of the blower through line 52. Treated gas is withdrawn through residue line 43. Gas holding vessel 46 is connected between teh feed and residue lines by connecting line 47. Valves 48 and 49 are pressure-regulating valves.

The invention is now further illustrated by the following examples, which are intended to be illustrative of the invention, but are not intended to limit the scope or underlying principles in any way.

EXAMPLES

Examples 1 and 2 compare the performance of gas separation systems treating a constant flow of raw gas.

EXAMPLE 1

Not in accordance with the invention.

Figure 4:
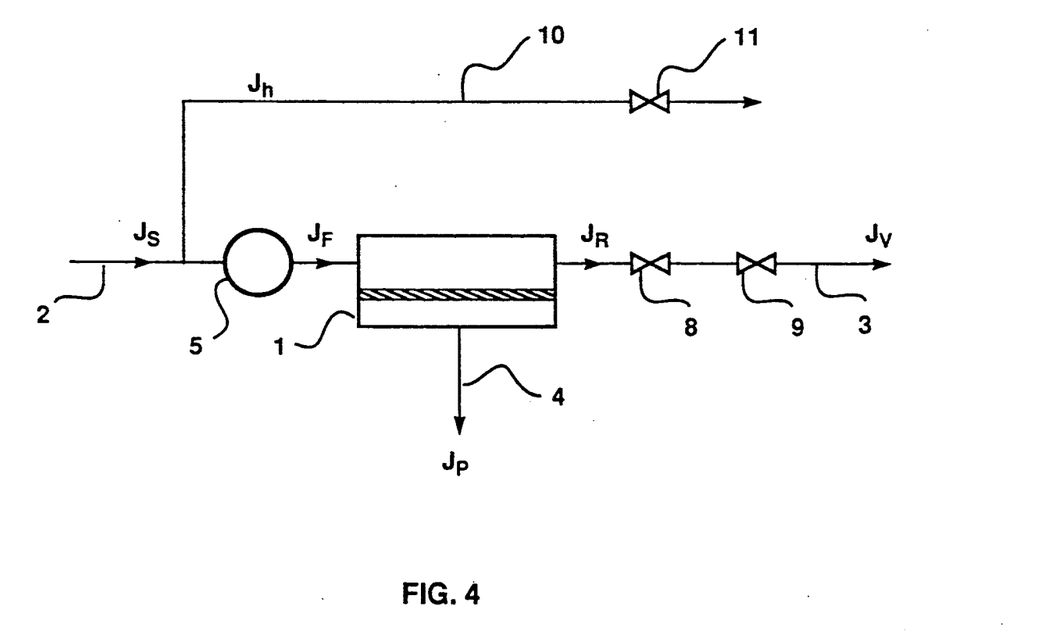
FIG. 4 is schematic drawing of a gas separation system not in accordance with the invention.

The ability of a gas separation system, not in accordance with the teachings of the invention, to separate CFC-11 from nitrogen was calculated. The system is shown schematically in FIG. 4. Compared with FIG. 1 or FIG. 2, the system lacks holding vessel 6 and connecting line 7. Instead, a bypass line 10, fitted with a one-way valve 11, is provided. Discharges from lines 10 and 3 combined form discharge flow $J_y$. The membrane unit has one membrane module containing 500 cm$^2$ of membrane. The membrane has a nitrogen normalized flux of $8\times10^{-5}$ cm$^3$ (STP)/cm$^2$·s·cmHg and a CFC-11 normalized flux of $320\times10^{-5}$ cm$^3$(STP)/cm$^2$·s·cmHg. The flow means is a compressor that can produce a flow of 10 L/min at a pressure of 150 psig. The raw gas entering the system was assumed to consist of 90% nitrogen and 10% CFC-11.

The performance of the system was calculated using a computer program based on the gas permeation equations for cross flow conditions described by Shindo et al., "Calculation Methods of Multicomponent Gas Separation by Permeation," *Sep. Sci. Technol.* 20, 445–459 (1985). Calculations were performed with a number of different constant flow rates. The results are shown in Table 1. When the raw gas flow is below about 2.5 L/min., all the gas permeates the membrane and no gas is vented from the system.

TABLE 1

| Feed flow (L/min) | Example 1: Discharge $J_y$ | | Example 2: Discharge $J_y$ | |
|---|---|---|---|---|
| | Flow (L/min) | CFC conc. (%) | Flow (L/min) | CFC conc. (%) |
| 3 | 0.9 | 0.0005 | 0.9 | 0.49 |
| 5 | 2.7 | 0.083 | 2.7 | 0.70 |
| 7 | 4.5 | 0.37 | 4.5 | 0.85 |
| 10 | 7.2 | 0.98 | 7.2 | 0.98 |
| 15 | 12.2 | 4.7 | 12.2 | 4.7 |
| 20 | 17.2 | 6.2 | 17.2 | 6.2 |
| 30 | 27.2 | 7.5 | 27.2 | 7.5 |

EXAMPLE 2

The performance of a system of the invention was calculated, using the same membrane, compressor, raw gas composition and constant raw gas flow rates as in Example 1. The calculations were performed for a system having a holding vessel capacity of 10 L, using the same computer program as used in Example 1. The calculated performance of the system in each case is given in Table 1. When the raw gas flow is below about 2.5 L/min, all the gas permeates the membrane and no gas is vented from the system, as in Example 1. At raw gas above 2.5 L/min but below flow means capacity of 10 L/min, the system without a holding vessel performs better than the system of the invention. This simply means that, for constant flows, one would not normally size the capacity of the flow means so much above the raw gas flow rate. At flows of 10 L/min or above, the performance of the system of the invention and the other system are the same. Thus, the system of the invention performs comparably to a conventional system.

Examples 3 and 4 compare the performance of gas separation systems treating a nonconstant flow of raw gas.

EXAMPLE 3

Not in accordance with the invention

Figure 5:
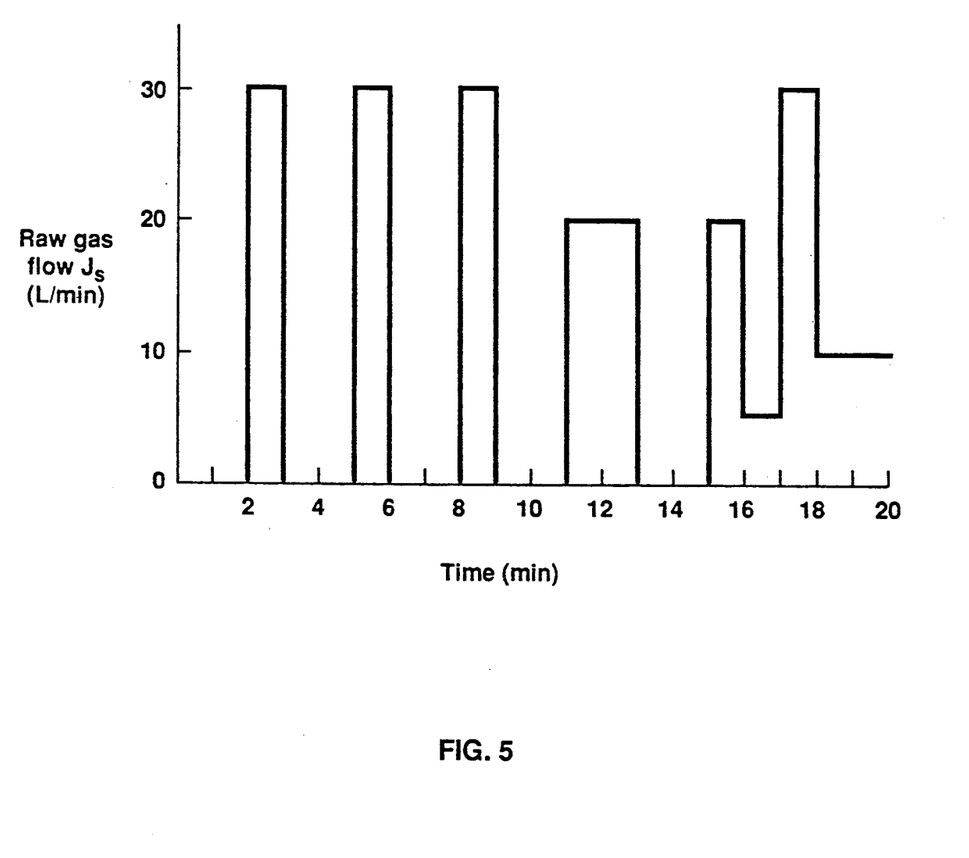
FIG. 5 is a flow profile over a 20 minute interval of a nonconstant gas flow.

The ability of a gas separation system, not in accordance with the teachings of the invention, to separate CFC-11 from nitrogen was calculated. The system is shown schematically in FIG. 4. Compared with FIG. 1 or FIG. 2, the system lacks holding vessel 6 and connecting line 7. Instead, a bypass line 10, fitted with a one-way valve 11, is provided. Discharges from lines 10 and 3 are mixed to form discharge flow $J_y$. The membrane unit has one membrane module containing 500 cm² of membrane. The membrane has a nitrogen normalized flux of $8 \times 10^{-5}$ cm³(STP)/cm²·s·cmHg and a CFC-11 normalized flux of $320 \times 10^{-5}$ cm³(STP)/cm²·s·cmHg. The flow means is a compressor that can produce a flow of 10 L/min at a pressure of 150 psig. The raw gas entering the system was assumed to consist of 90% nitrogen and 10% CFC-11, and to flow according to the profile shown in FIG. 5. The average flow rate over the 20 minute interval is 10.25 L/min.

The performance of the system was calculated using a computer program based on the gas permeation equations for cross flow conditions described by Shindo et al., "Calculation Methods for Multicomponent Gas Separation by Permeation," *Sep. Sci. Technol*, 20, 445–459 (1985). The calculated performance of the system is given in Table 2. The total volume of gas that is discharged through lines 3 and 10 combined is 177.5 L, with a mean CFC concentration of 6.5% and a maximum concentration of 7.5%.

EXAMPLE 4

The performance of a system of the invention was calculated, using the same membrane, compressor, raw gas composition and raw gas flow profile as was used in Example 3. The calculations were performed for systems having holding vessels of capacity 5 L, 10 L and 20 L, using the same computer program as was used in Example 3. The calculated performance of the system in each case is given in Table 2. Table 2 shows that the total volume of gas discharged is the same as in Example 3, 177.5 L. However, the mean CFC concentration in the discharge stream decreases from 6.5% for comparative Example 1 to 4.7% for the system with the 5 L holding vessel, 3.4% for the system with the 10 L holding vessel and 0.9% for the system with the 20 L holding vessel.

The maximum concentration in the discharge stream is 6.2% for the system with the 5 L holding vessel, 6.2% for the system with the 10 L holding vessel and 3.9% for the system with the 20 L holding vessel, compared with 7.5% for the system of comparative example 3.

We claim:

1. A process for removing a gas from a raw gas mixture, comprising:
   (i) providing a gas separation apparatus, comprising:
      (a) a membrane having a feed side, to which a feed line and a residue line are connected, and a permeate side;
      (b) flow means in said feed line, said flow means providing a flow of gas through said feed line to said feed side;
      (c) a connecting line joining said feed and residue lines and having connected therein a gas holding vessel; said gas holding vessel and said membrane being thereby connected in parallel so that at least a portion of a raw gas mixture entering said apparatus may flow through said feed line to said membrane without first entering said gas holding vessel and a second portion of said raw gas mixture entering said apparatus may optionally flow through said connecting line to said gas holding vessel without first passing over said membrane:
   (ii) passing said raw gas mixture through said feed line;
   (iii) withdrawing through said residue line a treated gas stream depleted in said gas compared with said raw gas mixture;
   (iv) withdrawing from said permeate side a permeate gas stream enriched in said gas compared with said raw gas mixture.

2. The process of claim 1, wherein at least a portion of said treated gas stream flows through said connecting line to said vessel.

3. The process of claim 1, wherein at least a portion of said raw gas mixture flows through said connecting line to said vessel.

4. The process of claim 1, wherein said raw gas mixture flows to said apparatus at a nonconstant rate.

5. The process of claim 4, wherein said raw gas mixture flows for a time at a rate greater than can be passed by said flow means.

6. The process of claim 5, wherein said vessel has a volume V that satisfies the relationship:

TABLE 2

| | Comparative example not according to the invention | | Examples according to the invention with various size holding vessels | | | | | |
| | | | 5 liters | | 10 liters | | 20 liters | |
| Time (min.) | Discharge flow (L) | Discharge conc. (%) | Discharge flow (L) | Discharge conc. (%) | Discharge flow (L) | Discharge conc. (%) | Discharge flow (L) | Discharge conc. (%) |
|---|---|---|---|---|---|---|---|---|
| 0-2 | 0 | 0 | 0 | 0 | 0 | 0 | 0 | 0 |
| 2-3 | 27.2 | 7.5 | 27.2 | 5.4 | 27.2 | 3.9 | 27.2 | 0.3 |
| 3-5 | 0 | 0 | 0 | 0 | 0 | 0 | 0 | 0 |
| 5-6 | 27.2 | 7.5 | 27.2 | 5.4 | 27.2 | 3.9 | 27.2 | 0.3 |
| 6-8 | 0 | 0 | 0 | 0 | 0 | 0 | 0 | 0 |
| 8-9 | 27.2 | 7.5 | 27.2 | 5.4 | 27.2 | 3.9 | 27.2 | 0.3 |
| 9-11 | 0 | 0 | 0 | 0 | 0 | 0 | 0 | 0 |
| 11-12 | 17.2 | 6.2 | 17.2 | 3.3 | 17.2 | 0.4 | 17.2 | 0.4 |
| 12-13 | 17.2 | 6.2 | 17.2 | 6.2 | 17.2 | 6.2 | 17.2 | 0.4 |
| 13-15 | 0 | 0 | 0 | 0 | 0 | 0 | 0 | 0 |
| 15-16 | 17.2 | 6.2 | 17.2 | 3.3 | 17.2 | 0.4 | 17.2 | 0.4 |
| 16-17 | 2.7 | 0.1 | 2.7 | 1.0 | 2.7 | 1.0 | 2.7 | 0.7 |
| 17-18 | 27.2 | 7.5 | 27.2 | 5.4 | 27.2 | 5.4 | 27.2 | 3.9 |
| 18-19 | 7.2 | 1.0 | 7.2 | 1.0 | 7.2 | 1.0 | 7.2 | 1.0 |
| 19-20 | 7.2 | 1.0 | 7.2 | 1.0 | 7.2 | 1.0 | 7.2 | 1.0 |
| Mean conc. (%) | | 6.5 | | 4.7 | | 3.4 | | 0.9 |

$$V = k \left[ \int_{t_1}^{t_2} J_s dt - J_f(t_2 - t_1) \right]$$

where $J_s$ is said nonconstant rate $J_f$ is the flow rate that can be passed by said flow means, $t_1$ and $t_2$ are times defining a time interval over which flow $J_s$ persists, and k is a constant having a value in the range 0.25-2.

7. A gas seperation apparatus, comprising:
 (a) a membrane having a feed side, to which a feed line and a residue line are connected, and a permeate side;
 (b) flow means in said feed line, said flow means providing a flow of gas through said feed line to said feed side;
 (c) a connecting line joining said feed and residue lines and having connected therein a gas holding vessel; said gas holding vessel and said membrane being thereby connected in parallel so that at least a portion of a raw gas mixture entering said apparatus may flow through said feed line to said membrane without first entering said gas holing vessel and a second portion of said raw gas mixture entering said apparatus may optionally flow through said connecting line to said gas holding vessel without first passing over said membrane.

8. The apparatus of claim 7, wherein said flow means is a pump.

9. The apparatus of claim 7, wherein said flow means is a blower.

10. The apparatus of claim 7, wherein said membrane is a composite membrane.

11. The apparatus of claim 7, wherein said membrane is an asymmetric membrane.

* * * * *